Jan. 6, 1970
B. E. RESENER
3,487,706
TORQUE RELEASE SPROCKET
Filed Jan. 24, 1968
2 Sheets-Sheet 1
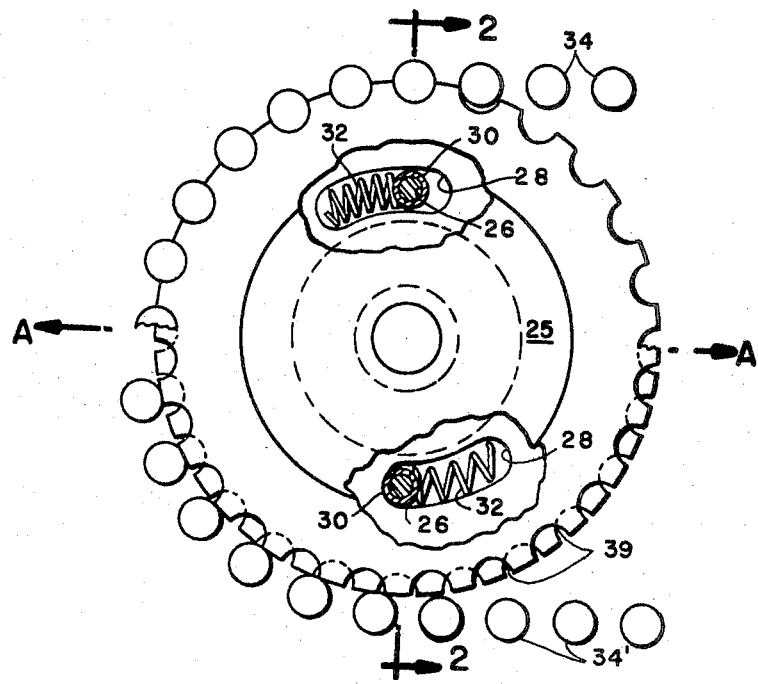
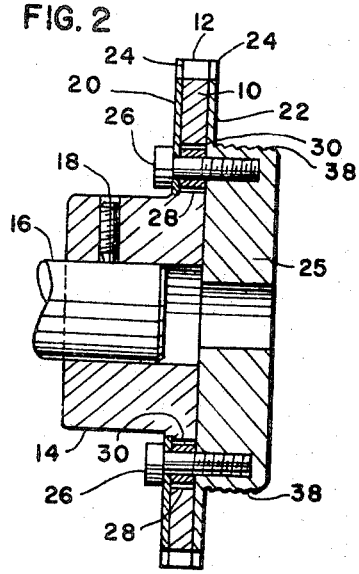
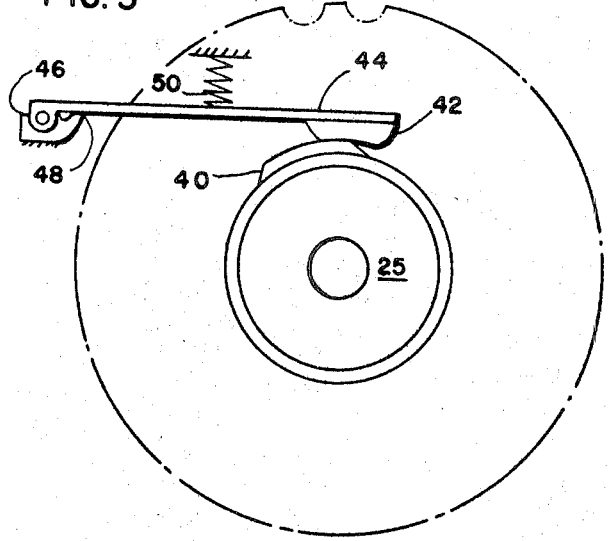
INVENTOR.
BAIRD E. RESENER
BY
ATT'YS Jan. 6, 1970

B. E. RESENER 3,487,706

TORQUE RELEASE SPROCKET

Filed Jan. 24, 1968

INVENTOR.
BAIRD E. RESENER
BY
Walter F. ...
ATT'YS

United States Patent Office 3,487,706
Patented Jan. 6, 1970

3,487,706
TORQUE RELEASE SPROCKET
Baird E. Resener, Indianapolis, Ind., assignor to Amsted Industries Incorporated, Chicago, Ill., a corporation of Delaware
Filed Jan. 24, 1968, Ser. No. 700,226
Int. Cl. F16h *55/18, 55/30*
U.S. Cl. 74—243          8 Claims

ABSTRACT OF THE DISCLOSURE

A chain engaging sprocket assembly includes a main drive sprocket and relatively movable auxiliary sprocket on both sides of the main sprocket, all of the sprockets having a normally aligned tooth structure of reduced height. During an overload, the chain rides over the sprockets, and the auxiliary sprockets, being spring loaded, are moved out of phase with the drive sprocket to fill the gaps between the teeth of the drive sprocket.

---

This invention relates to disengageable drive assemblies and more particularly to a sprocket assembly that is capable of disengaging from a chain during overload.

While many known torque limiting devices operate by frictionally engaging surfaces, many applications require a device that is capable of completely disengaging or releasing during an overload. The latter type of device is especially desirable where excessive heat produced by friction would be detrimental to the drive. Most such torque release devices, however, are generally complicated, requiring latching or equivalent parts to maintain the driving members in a disengaged relationship. In the art of chain and sprocket drives, few, if any, such devices have been found suitable to disengage the chain from the sprocket.

Accordingly, an object of this invention is to provide a sprocket assembly that is capable of releasing engaging members of a chain or the like during overload in a relatively frictionless manner.

Another object is to provide an overload release sprocket assembly of relatively simple construction compared to known devices, having a high capacity for its size, and capable of being reset without difficulty.

Other objects will become apparent to those skilled in the art from the following description taken in connection with the accompanying drawings wherein:

FIGURE 1 is an elevational view of a sprocket assembly with a portion thereof broken away to reveal the inner structure, the upper portion of said sprocket assembly above the dividing plane A—A showing the position of the sprocket teeth during engagement of the chain, the lower portion thereof below the dividing plane A—A showing the position of said teeth during disengagement;

FIGURE 2 is a cross-sectional view taken substantially along section line 2—2 of FIGURE 1;

FIGURE 3 is an outline elevational view of the structure shown in FIGURE 1, showing automatic means for resetting the device;

Figure 4:
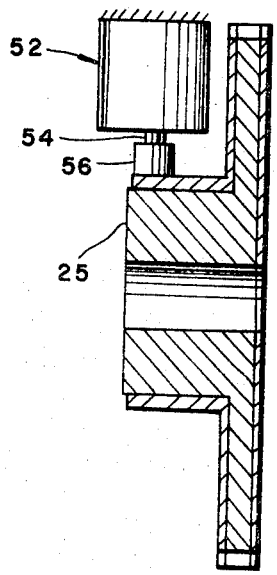
FIGURE 4 is a cross-sectional outline view corresponding to FIGURE 3, showing another automatic means for resetting the device.

With more particular reference to FIGURES 1 and 2, the sprocket assembly includes a drive sprocket 10 having a plurality of teeth 12 in the outer periphery thereof and secured around a hub 14 adapted to be connected to a shaft 16 by means of a set screw 18. A pair of coaxial control sprockets 20 and 22 having a plurality of teeth 24 in the outer periphery thereof are provided adjacent the drive sprocket 10 and are coaxial therewith. One control sprocket 22 is directly secured to an annular member 24 adjacent the hub 14 and coaxial therewith, and the other control sprocket 20 extends inwardly around said hub and is secured to the former control sprocket and said annular member by means of two or more cap screws 26 passing through respective slots 28 in the drive sprocket, and into said annular member. The two control sprockets 20 and 22 are so interconnected independently of the drive sprocket 10 such that the teeth 24 of said control sprockets are in substantial alignment.

The slots 28 in the drive sprocket 10 are curved relative to the axis of the drive sprocket such that the control sprockets 20 and 22 remain relatively coaxial with said main sprocket upon relative rotation therebetween. A sleeve bearing 30 may be provided around that portion of each cap screw 26 within a respective slot 28 in order to reduce friction therebetween. Preferably, the sleeve bearings 30 are slightly longer than the width of the drive sprocket 10, thereby also minimizing friction between said drive sprocket and the control sprockets 20 and 22. A helical or other suitable spring 32 is provided in each slot 28 between one end of said slot and the sleeve bearing 30 therein, in order to urge said sleeve bearing and its respective cap screw 26 toward the other end of said slot and thereby to urge the control sprockets 20 and 22 together in one rotational direction relative to the drive sprocket 10.

The cap screws 26 and their respective sleeve bearings 30 are so positioned that the teeth 24 of the control sprockets 20 and 22 are substantially entirely out of phase with the teeth 12 of the drive sprocket 10 when the control sprockets 20 and 22 are urged to a maximum extent by the springs 32, i.e., when the sleeve bearing 30 and its respective cap screw 26 are urged to the end of their respective slot 28, as shown in the lower half of FIGURE 1 below the dividing plane A—A. When the teeth 12 of the drive sprocket 10 are in phase with the teeth 12 the control sprockets 20 and 22, the spring 32 is compressed, as the transverse members 34, such as the rollers of a roller chain, serve to maintain said teeth in phase.

It will be noted that the control sprockets 20 and 22 and the drive sprocket 10 all have the same number of teeth, extending radially outwardly to the same outside diameter. It will also be noted that the teeth on all sprockets have been cut down to permit the chain to jump out of engagement with the teeth at a predetermined torque level. Generally, the sprocket teeth must be cut down from their normal height to a height which is beneath the chordal pitch line, said line being defined as that line drawn between two successive chain roller (or other transverse member) centers when seated in the tooth seat. It has been found that the teeth may be cut down to a slight depression in the sprockets, it being understood that the chain will disengage at successively lower torque levels as the teeth heights are successively reduced.

It should also be understood that the pitch of the chain or an equivalent will also affect the torque level required for release. For example, the pitch of the chain may originally be theoretically too long or too short for the sprockets, and the pitch may become too long upon aging of the chain, all of which may affect the theoretical torque required to release the chain from the sprockets. Generally, a variation in chain pitch would tend to decrease the transmitted load on the sprockets, and the chain would release at a lower torque.

In operation, the teeth 24 of the control sprockets 20 and 22 are rotated into phase, and the transverse members 34 are placed into engagement with the sprocket teeth. This operation is facilitated by the provision of a knurled surface, indicated at 38 in FIGURE 2 around the outer periphery of the annular member 24, which may be grasped and rotated while holding the shaft 16 and the hub 14 relatively stationary. Operation of the device may then be commenced.

Upon overload, the chain members 34 jump out of their engagement with the sprockets and the teeth 24 of the control sprockets 20 and 22 are urged out of phase with the teeth 12 of the drive sprocket by the action of the springs 32, thereby preventing reengagement of the chain with the sprockets and presenting a relatively continuous surface over which the chain may ride. It will be noted from the lower portion of FIGURE 1 that when the teeth are out of phase, there are very slight gaps 39 between adjacent teeth. During overload, the chain members 34' ride over these gaps without undue friction, but also, an audible signal is produced, which would enable immediate detection of this condition.

In the use of the sprocket assembly described above, it may be necessary to provide additional length in the chain, in order to compensate for the additional slack required upon overload.

Figure 5:
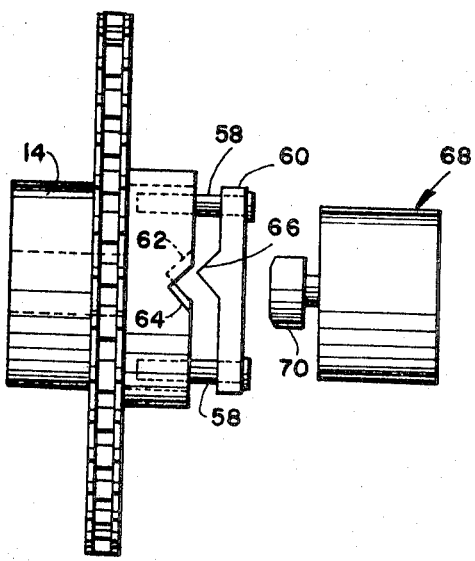
FIGURE 5 is a side elevational view of the sprocket assembly shown in FIGURES 1 and 2, illustrating yet another means for automatically resetting the device.

FIGURES 3, 4 and 5 illustrate several modifications to the device described above that will enable automatic resetting of the device after an overload. The design and operation of the sprocket devices shown, however, are identical to that hereinbefore described and, unless otherwise indicated, will not be described again in detail.

FIGURE 3 shows a modification comprising a raised segment or cam 40 on the annual member 24 engageable with the friction pad 42 at one end of an arm 44 pivotally connected at its other end to a relatively stationary bracket 46 having a stop 48 for limiting movement of said arm toward said cam. The arm 44 and its friction pad 42 are normally urged toward the cam 40 by means of a spring 50 or other suitable power device. The continual engagement of the friction pad 42 with the cam 40 with each revolution of the device will insure resetting of the device when overload conditions have ceased.

FIGURE 4 shows a linear actuator 52 for reciprocating a rod 54 connected to a friction pad 56 engageable with the outer annular surface of annular member 24. Upon actuation, the friction pad 56 engages annular member 24 to retard the motion thereof and thereby allows the chain to become reseated in the device.

FIGURE 5 shows still another arrangement for resetting the device during rotation thereof. In this instance, the drive sprocket hub 14 extends axially on both sides of the sprocket assembly and the annular member 24 is so designed to be rotatably sleeved over one side of said hub. The main sprocket hub 14 has openings for receiving the guide pins 58 of a striker plate 60 secured thereto. The main sprocket hub 14 and the annular member 24 have V-shaped notches 62 and 64, respectively, which align when the teeth of the sprocket assembly are in phase. The striker plate has a V-shaped protrusion 66 engageable with both of the V-shaped notches 62 and 64 and a suitable relatively fixed power source 68 is provided for urging a striker 70 against the striker plate 60. In order to reset the device, the power source 68 is activated, thereby causing the protrusion 66 to engage and align the notches 62 and 64.

Figure 6:
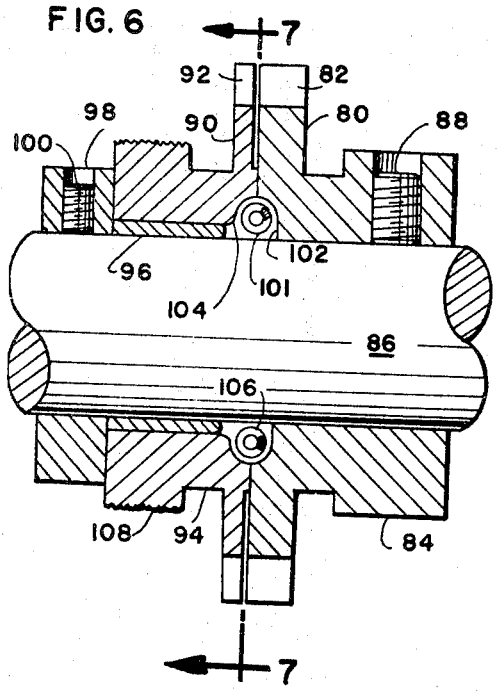
FIGURE 6 is a cross-sectional view of another embodiment of the present invention.
Figure 7:
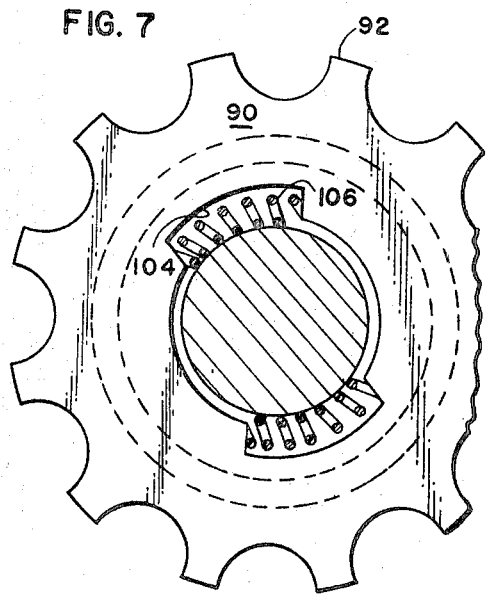
FIGURE 7 is a view taken substantially along line 7—7 of FIGURE 6.

FIGURES 6 and 7 show another embodiment of the invention wherein only one control sprocket is utilized. The drive sprocket 80, having a plurality of teeth 82 in the outer periphery thereof, is secured around a hub 84 secured to a shaft 86 by means of a set screw 88 or the like. The control sprocket 90, having a plurality of teeth 92 similar to the drive sprocket teeth 82, is secured around a second hub 94 rotatably mounted by an annular bearing 96 around the shaft 86. The hubs 84 and 94 are rendered closely adjacent by means of an annular collar 98 secured by a set screw 100 on the other side of the control sprocket hub 94, thereby preventing excessive axial movement thereof.

The adjacent or facing surfaces of the respective hubs 84 and 94 are provided with at least two sets of mating annular groove segments 102 and 104, respectively, which segments define cavities for the reception in each of a helical spring 106. When the length of the groove segments 102 and 104 are in alignment, as urged by their common spring 106, the teeth 82 and 92 of respective sprockets 80 and 90 are urged out of phase, thereby rendering this device similar in operation to that hereinbefore described. The outer radius of the control sprocket hub 94 may be knurled, as indicated at 108, thereby facilitating manual resetting of the device.

Having thus described the invention, what is claimed is:
1. A torque release sprocket assembly comprising
  (i) a plurality of sprockets each including a plurality of teeth,
    (a) the teeth of respective sprockets being movable into and out of alignment,
    (b) the teeth of respective sprockets being movable out of alignment to the extent that said teeth define a substantially continuous surface around the outer periphery thereof,
  (ii) interconnected members engageable between the teeth of respective sprockets when the teeth thereof are in alignment,
  (iii) means for allowing said interconnected members to ride over the aligned teeth of said sprockets during torque overload, and
  (iv) means for urging the teeth of said sprockets out of alignment such that a substantially continuous surface is presented to said interconnected members during such overload, thereby permitting said members to ride over said surface.

2. The torque release assembly according to claim 1 wherein means are provided for at times urging the teeth of said sprockets into phase during the rotation thereof.

3. A rotatable torque release sprocket assembly comprising
  (i) drive sprocket means,
  (ii) control sprocket means adjacent said drive sprocket means and coaxial therewith,
    (a) said drive and control sprocket means each having a plurality of teeth,
    (b) the teeth of said control sprocket means being movable into and out of alignment with said drive sprocket means and presenting a substantially continuous surface at the outer periphery of said teeth when moved out of alignment,
  (iii) interconnected members engageable between the aligned teeth of said drive and control sprocket means,
  (iv) the teeth of said drive and control sprocket means being reduced in height relative to standard height to the extent that said interconnected members may ride up over said teeth during a torque overload of predetermined level, and
  (v) means for normally urging the teeth of said control sprocket means out of alignment with the teeth of said drive sprocket means to the extent that the misaligned sprocket teeth present a substantially continuous surface over which said interconnected members may ride.

4. The torque release sprocket assembly according to claim 3 wherein a plurality of annular slot segments are provided in said drive sprocket means, said control sprocket means includes a control sprocket on both sides of said drive sprocket means, means are provided for securing said control sprockets together with the teeth of one control sprocket in alignment with the teeth of the other control sprocket, and spring means is provided in each of said slot segments for urging said control sprockets together in one rotational direction relative to said drive sprocket means.

5. The torque release sprocket assembly according to claim 4 wherein means are provided to retard motion of said control sprocket means relative to motion of said drive sprocket means, whereby the sprocket assembly may be reset after an overload has occurred.

6. The torque release sprocket assembly according to claim 5 wherein the means to retard motion of said control sprocket means comprises a cam fixedly associated with one of said control sprockets, an arm, a friction pad associated with said arm, and means engaging said arm for urging said friction pad into contact with said cam.

7. The torque release sprocket assembly according to claim 5 wherein the means to retard motion of said control sprocket means comprises an extension from each of said drive sprocket means and said control sprocket means, alignable notches in each of said extensions, the teeth of said control and drive sprocket means being in alignment when said notches are in alignment, and means for bringing said notches into alignment.

8. The torque release sprocket assembly according to claim 1 wherein said control sprocket means includes a single sprocket adjacent said drive sprocket means, means for holding said sprocket adjacent said drive sprocket means, mating groove segments in the facing surfaces of said sprocket and said drive sprocket means and a cavity defined thereby, and a helical spring in said cavity.

References Cited

UNITED STATES PATENTS

| | | | |
|---|---|---|---|
| 717,976 | 1/1903 | Dodge | 74—243 |
| 1,240,126 | 9/1917 | Dubois | 74—440 |
| 1,449,903 | 3/1923 | Leow | 74—440 |
| 1,539,149 | 5/1925 | Thornburg | 74—440 |
| 1,604,105 | 10/1926 | Starkey | 74—440 |
| 1,608,050 | 11/1926 | Bailey | 74—440 |

FRED C. MATTERN, Jr., Primary Examiner

J. A. WONG, Assistant Examiner

U.S. Cl. X.R.
64—27; 74—440